March 26, 1940.    W. H. SCHULZ    2,194,573
GUARD FOR ELECTRIC WELDERS
Filed Aug. 27, 1938    2 Sheets-Sheet 1
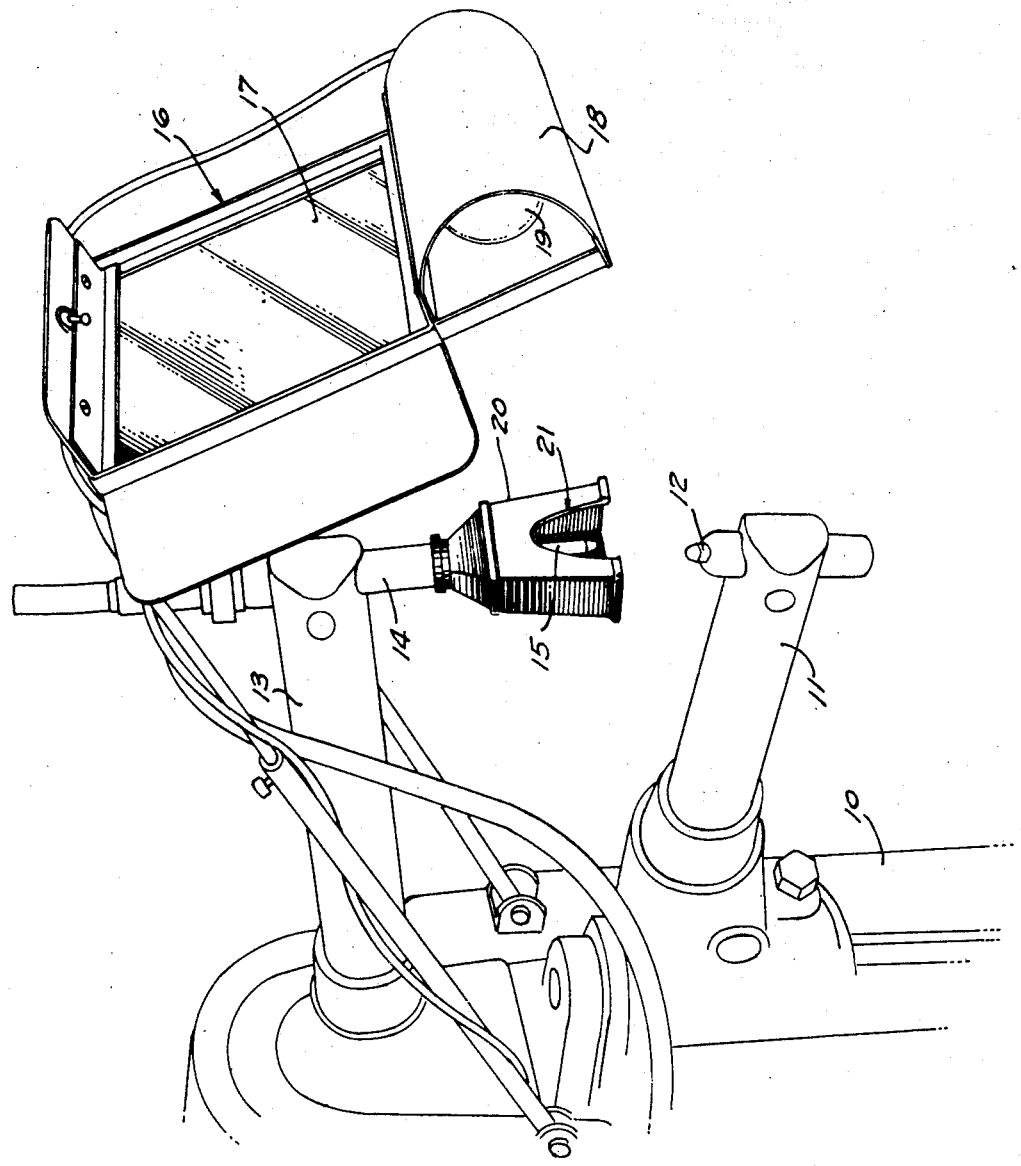
Inventor
William H. Schulz
By his Attorneys
Merchant & Merchant March 26, 1940.  W. H. SCHULZ  2,194,573
GUARD FOR ELECTRIC WELDERS
Filed Aug. 27, 1938  2 Sheets-Sheet 2
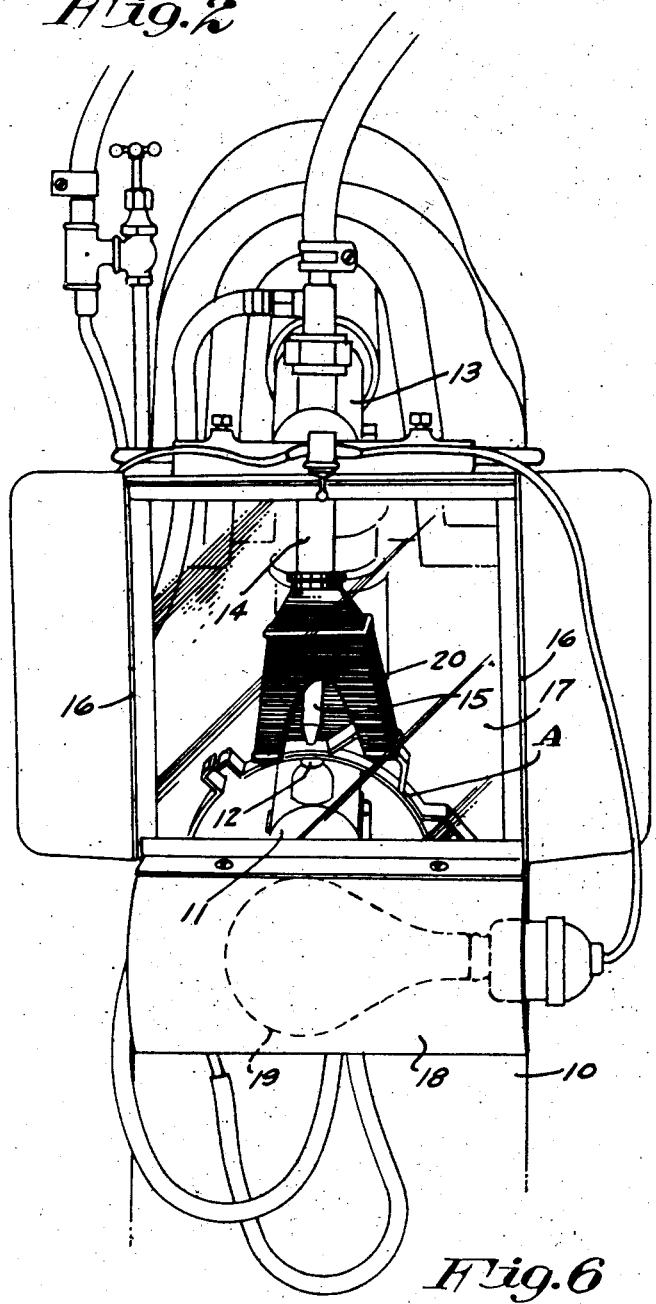
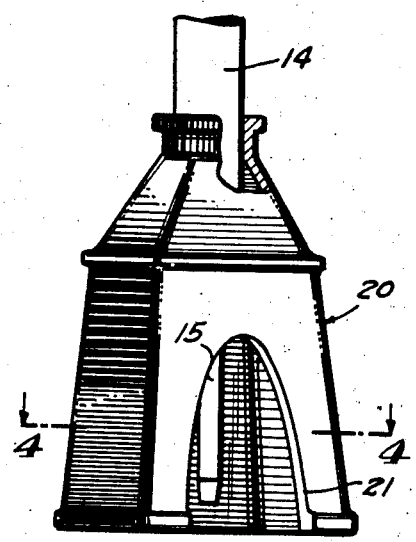
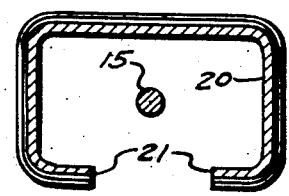
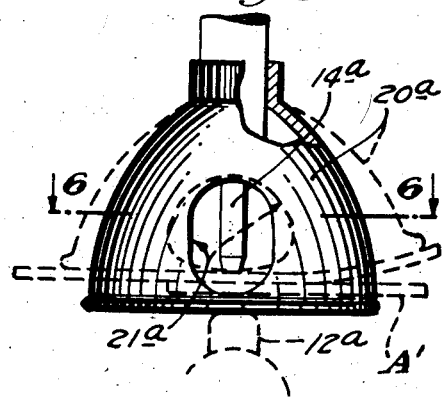
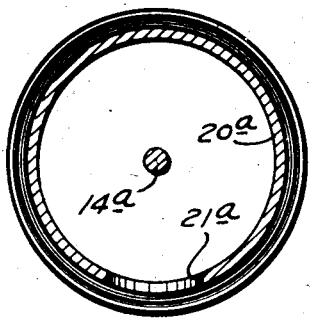
Inventor
William H. Schulz
By his Attorneys Patented Mar. 26, 1940

2,194,573

UNITED STATES PATENT OFFICE 2,194,573

GUARD FOR ELECTRIC WELDERS

William H. Schulz, St. Paul, Minn., assignor to Donaldson Company, Inc., St. Paul, Minn., a corporation of Minnesota Application August 27, 1938, Serial No. 227,139

2 Claims. (Cl. 219—4)

My invention provides an improved guard for electric welders and, generally stated, consists of the novel devices, combinations of devices and arrangement of parts hereinafter described and defined in the claims.

In the use of spot welders and other electric welding devices or apparatus, it is a well-known fact that the sparks produced will fly in all sorts of directions and that these sparks being red hot metal produce very serious burning effects. To protect the operator or welder from these sparks they sometimes wear goggles and protecting aprons, but in the modern welders there is usually provided a shield in the nature of a frame having a transparent pane of glass or the like therein supported in such position that the welder back of the same can see the welding operation and properly control the work. These welders are usually employed in shops where persons will pass or workmen will be near the welding operation and not protected by the shield. It is especially to protect persons in the vicinity of the welding operation, other than the actual operator, that the improved device is provided. However, the improved shield does give additional protection even to the operator.

Welding machines of the modern type usually have a relatively fixed lower arm supporting a lower electrode and a relatively movable upper arm supporting the upper or movable electrode. In the operation of my invention for welding machines of this character, the improved shield is applied closely around the upper or movable electrode and is preferably provided with a lateral sight opening so aligned with the transparent pane of the shield that the operator can see the welding operation as it takes place. Shields of the modern welders also usually have a reflector and a light bulb therein arranged to project a light beam through the sight opening of the shield and onto the electrodes for proper positioning and inspection of the work.

The various articles to be welded will have various form and it is important that the guard be capable of conforming always to the surface of the work and closely around the welding point or spot; and hence, the guard is made of elastic material such as rubber, but possibly of other material such as leather or the like.

The improved guard is made bell-shaped and provided with a notch or opening in one side that is only large enough to permit good inspection of the electrodes and which will, therefore, intercept all sparks except the few that may be projected out through the sight opening.

In the accompanying drawings, which illustrate a preferred form of the device applied to a welding machine such as described, like characters indicate like parts throughout the several views.

Referring to the drawings:

Fig. 1 is a perspective showing the improved guard applied as above described;

Fig. 2 is a front elevation of the parts shown in Fig. 1;

Fig. 3 is an elevation showing the improved guard applied around the upper electrode;

Fig. 4 is a section taken on the line 4—4 of Fig. 3;

Fig. 5 is a view corresponding to Fig. 3, but illustrating a slightly modified form of the guard; and Fig. 6 is a section taken on the line 6—6 of Fig. 5.

The parts of the welding apparatus being of known type may be briefly noted as follows: The supporting pedestal 10 is provided with the fixed lower arm 11 equipped with a lower electrode 12. The relatively movable upper arm 13 carries a shaft-like upper electrode 14 that is equipped with the depending removable electrode tip 15.

The shield shown involves a frame 16 with a transparent pane 17, a reflector 18, and a light bulb 19.

The guard, the preferred form of which is illustrated in Figs. 1 to 4, inclusive, is a bell-shaped structure shown as rectangular in horizontal section. This bell-shaped guard 20, which is preferably of rubber, is provided in its front side with a notch 21 that affords a light passage so positioned that the operator looking through the pane or window 17 may see the tip of the electrode 15, and the light beam projected from the light bulb 19 will be projected through the opening 21 onto said electrode. In accordance with the present illustrations of the invention, the contracted neck portions of the elastic guards 20 and 20a are telescopically applied around the electrode 14 and are adjustably anchored thereto by frictional engagement therewith brought about solely by virtue of yielding tension exerted by said neck portions on the electrode. It is, of course, necessary to the satisfactory operation of the device that the elastic guards 20 and 20a engage the electrode with sufficient tension to prevent accidental longitudinal shifting thereof from any desired adjusted portion, and, of course, if this is to be accomplished in the manner illustrated and without resorting to auxiliary locking or clamping devices, the interior portions of the elastic guards must be made slightly smaller in diameter than the electrode to which they are to be applied so that application of the neck portions to the electrode will require stretching of said neck portions to the extent required to obtain the necessary or desired degree of frictional engagement with the electrode. As illustrated in Figs. 3 and 5, the elastic bell-shaped guards 20 and 20a are preferably so adjustably positioned on their enclosed electrodes that the flared free end portions thereof will project slightly beyond but terminate in a plane closely adjacent the free ends of an enclosed electrode. In this way, maximum protection against flying hot metallic sparks is assured, and, of course, the resilient characteristics of the guards will permit such distortion after contact with the work as is necessary to permit complete closing of the electrodes on to the work.

In Fig. 2 a band-like structure A, which has an irregular exterior, is shown as positioned on the lower electrode with the upper electrode pressed onto the same and the guard 20 deformed so as to closely fit the irregular surface of the said article A without interference with movement of the electrodes into operative positions. Of course, the guard being of rubber or elastic material will resume its normal form when it is relieved from pressure.

In Figs. 5 and 6 the guard 20a is approximately hemispherical and a sight opening or like passage is formed by an elongated perforation or hole 21a. In these views, Figs. 5 and 6, the lower electrode is indicated by the character 12a, the upper electrode by the character 14a, and the work being welded by the character A'.

The importance of the device illustrated is thought to be obvious and it is understood that it is capable of modifications within the scope of the invention herein disclosed and claimed. The guard is herein referred to as being bell-shaped but that term is used in a liberal sense and not limited to the exact form of the guard, either in axial or cross-section, as long as it has the housing effect of a bell-shaped device.

What I claim is:

1. In a welding machine having a pair of electrodes, one of which is movable toward and from the other thereof, an elastic bell-shaped guard surrounding one of the electrodes and having a reduced diameter neck portion telescopically applied over and anchored against accidental movement with respect to the enclosed electrode, and having its flared elastic skirt portion terminating with its free edge in a plane closely adjacent the plane of the free end of the enclosed electrode, the elastic skirt of said guard being capable of great temporary deformation throughout under engagement with work of widely varying contour interposed between the electrodes and without interfering with the movement of the electrodes into operative position.

2. The structure defined in claim 1 in which said reduced diameter neck portion is also elastic and the normal diameter of said elastic neck portion of the guard is less than that of the portion of the enclosed electrode to which it is applied, and in which said neck portion is stretched and under tension to contract, whereby the guard is anchored against accidental displacement solely by frictional engagement resulting from the elastic tension of said neck portion.

WILLIAM H. SCHULZ.